US009618683B2

(12) United States Patent
Gantenbrink

(10) Patent No.: US 9,618,683 B2
(45) Date of Patent: Apr. 11, 2017

(54) LUMINAIRE HAVING A LIGHT GUIDE

(71) Applicant: Glashutte Limburg Leuchten GmbH & Co. KG, Limburg (DE)

(72) Inventor: Heinrich J. Gantenbrink, Menden (DE)

(73) Assignee: GLASHUTTE LIMBURG LEUCHTEN GMBH + CO. KG, Limburg (DE)

( * ) Notice: Subject to any disclaimer, the term of this patent is extended or adjusted under 35 U.S.C. 154(b) by 150 days.

(21) Appl. No.: 14/569,090

(22) Filed: Dec. 12, 2014

(65) Prior Publication Data

US 2015/0168633 A1    Jun. 18, 2015

(30) Foreign Application Priority Data

Dec. 16, 2013    (DE) ........................ 10 2013 021 357

(51) Int. Cl.
*F21V 13/04*    (2006.01)
*F21V 8/00*    (2006.01)
(Continued)

(52) U.S. Cl.
CPC .............. *G02B 6/0055* (2013.01); *F21S 8/02* (2013.01); *F21S 8/026* (2013.01); *F21V 1/00* (2013.01); *F21V 5/048* (2013.01); *F21V 7/06* (2013.01); *F21V 13/04* (2013.01); *F21V 13/10* (2013.01); *F21V 13/12* (2013.01); *F21V 3/00* (2013.01); *F21V 5/04* (2013.01); *F21V 7/0016* (2013.01); *F21Y 2101/00* (2013.01)

(58) Field of Classification Search
CPC .......... F21V 5/046; F21V 5/048; F21V 13/04; F21V 13/10; F21V 13/12; F21V 1/00; F21V 7/06; F21S 8/02; F21S 8/026; G02B 6/0055
See application file for complete search history.

(56) References Cited

U.S. PATENT DOCUMENTS

| 8,485,692 | B2 * | 7/2013 | Li .................... G02B 19/0066 362/308 |
| 2006/0245178 | A1 | 11/2006 | Engel | |
| 2014/0254154 | A1 * | 9/2014 | Catalano ................ F21V 13/10 362/243 |

FOREIGN PATENT DOCUMENTS

| DE | 3812764 A1 | 10/1989 |
| DE | 10116040 A1 | 10/2002 |

(Continued)

*Primary Examiner* — Anh Mai
*Assistant Examiner* — Nathaniel Lee
(74) *Attorney, Agent, or Firm* — Baker and Hostetler LLP

(57) ABSTRACT

A luminaire, in particular a downlight, comprises a light source and a reflector, the reflector having a light entrance end and a light exit end, the light entrance end comprising at least one light entrance aperture with an edge and the light exit end comprising a light exit aperture. A luminaire shade encompasses the reflector at least partially. A first portion of the light source light is emitted by the reflector through the light exit aperture and a second portion is emitted through the luminaire shade. The light source is an LED. The luminaire includes a light guide arranged near the light entrance aperture between the LED and light exit end so at least some LED light enters into the light guide, the light guide comprising a light-guiding area extending perpendicular to the longitudinal extension of the reflector at least partially beyond the edge of the light entrance aperture.

17 Claims, 1 Drawing Sheet

(51) Int. Cl.
*F21S 8/02* (2006.01)
*F21V 7/06* (2006.01)
*F21V 13/12* (2006.01)
*F21V 1/00* (2006.01)
*F21V 13/10* (2006.01)
*G02B 6/00* (2006.01)
*F21V 3/00* (2015.01)
*F21V 5/04* (2006.01)
*F21V 7/00* (2006.01)
*F21Y 101/00* (2016.01)

(56) References Cited

FOREIGN PATENT DOCUMENTS

| | | |
|---|---|---|
| DE | 102012007206 A1 | 10/2013 |
| EP | 0 499 044 A1 | 8/1992 |
| EP | 0 940 331 A1 | 9/1999 |
| WO | 2010136248 A1 | 12/2010 |

\* cited by examiner

LUMINAIRE HAVING A LIGHT GUIDE

CROSS-REFERENCE TO RELATED APPLICATION

This application claims priority to foreign German patent application No. DE 102013021357.6, filed on Dec. 16, 2013, the disclosure of which is incorporated by reference in its entirety.

FIELD OF THE INVENTION

The present invention relates to a luminaire, in particular a downlight, according to the preamble of independent claim 1. A generic luminaire comprises a light source and a reflector, the reflector having a light entrance end and a light exit end, the light entrance end comprising at least one light entrance aperture with an edge and the light exit end comprising a light exit aperture. The luminaire further comprises a luminaire shade which encompasses the reflector at least partially, wherein a first portion of the light of the light source is emitted by the reflector through the light exit aperture and a second portion of the light of the light source is emitted through the luminaire shade.

That is, a first portion of the light is used as a light bundle to illuminate an area in front of the reflector. A second portion of the light is used through the luminaire shade to illuminate the surroundings. The ceiling, for example, can be illuminated diffusely. The second portion of the light may also be emitted in any other direction, however, for example for the diffuse illumination of an area that surrounds the area illuminated by the reflector.

BACKGROUND

A plurality of luminaires using conventional incandescent lamps or energy saving lamps as light sources are known in the prior art. To save even more energy conventional luminaires are partially also provided with LEDs that have special optical attachments. The optical attachments are required to obtain a radiation characteristic similar to that of conventional illuminants. However, a compatible LED replacement illuminant is not available for all fields of application. Moreover, the production and development thereof are cost-efficient. It is, therefore, desirable to develop luminaires specifically for the use of LEDs.

A luminaire of the above-described type is known, for example, from DE 38 12 764 A1. The reflector of this luminaire includes several slots through which a portion of the light of a halogen lamp is passed to a sheet of transparent plastic which guides the light to the outside and emits it in a radial direction for decorative illumination purposes.

The disadvantage of the luminaire known from DE 38 12 764 A1 is that the slots in the reflector render the light emitted by the reflector non-uniform. Also, the light passed through the slots is not effectively coupled into the transparent plastic sheet. And it is not suited for the use of a simple LED as this would require an LED replacement illuminant compatible with the shape and holder of the halogen lamp.

A luminaire of the above-described type is known, for example, from DE 101 16 040 A1. In this luminaire a two-filament halogen lamp is used, the lamp being arranged such that one coil is arranged inside the reflector. The second coil is arranged outside the reflector, in front of the light entrance aperture, and thus illuminates the luminaire shade.

The disadvantage of the luminaire known from DE 101 16 040 A1 is that the use of a two-filament halogen lamp, respectively, two light sources is an obstacle to a compact design of the luminaire. In addition, it is not suited for the use of an LED.

SUMMARY OF THE INVENTION

It is the object of the present invention to provide a luminaire which is compact and simple in design and suited for the use of LEDs.

The object is achieved by the features of claim 1. Accordingly, in connection with a luminaire of the above-mentioned type, the object is solved in accordance with the invention if the light source is an LED, the luminaire further comprising a light guide being arranged in the area of the light entrance aperture between the LED and the light exit end such that at least a portion of the light of the LED enters into the light guide, the light guide comprising a light-guiding area which extends in a direction perpendicular to the longitudinal extension of the reflector at least partially beyond the edge of the light entrance aperture.

The invention has the advantage that the luminaire allows a very simple and compact construction due to the use of an LED. The use of a light guide allows, in spite of the compact construction, a distribution of the light emitted by the LED between the reflector and the luminaire shade.

In other words, in a projection on the light entrance aperture of the reflector the light guide is broader than the light entrance aperture in at least one direction. If the reflector and the light guide are configured rotationally symmetrical and arranged coaxially the light guide thus extends in a radial direction beyond the edge of the light entrance aperture. The light portion emitted by the reflector is passed from the LED through the light guide into the reflector. The light-guiding area reflects a portion of the light from the LED away from the light entrance aperture, e.g. by total reflection, and guides the light portion to be emitted through the shade of the luminaire.

Preferably, the light emitted through the luminaire shade is emitted substantially in a direction perpendicular to the light radiation direction that is defined by the light exit aperture of the reflector. It is also possible, however, that the light emitted through the luminaire shade is emitted in any other direction.

The light source of the luminaire according to the invention is formed of one LED or several LEDs, whereby identical or different LEDs may be used. The LED may also include a primary lens. Preferably, so-called SMD-LEDs are used, which are directly soldered onto a board.

Within the scope of the present invention the LED may also be formed integrally with the light guide. Also, it is conceivable that the light guide is formed integrally with the luminaire shade, respectively, the light guide can form at least a part of the luminaire shade. However, the light guide may also be formed of multiple parts, respectively, the luminaire shade can form at least a part of the light guide.

Within the scope of the present invention a luminaire shade refers to both a fully transparent luminaire shade and a semi-transparent or opaque luminaire shade.

Within the scope of the present invention a cover glass may be arranged in the light exit aperture of the reflector. This cover glass may at least partially be transparent, semi-transparent or opaque. It is also conceivable that the cover glass is connected to the luminaire shade, respectively, that the luminaire shade and the cover glass are formed integrally.

A luminaire according to the invention may in particular be designed as a ceiling spotlight or downlight. It is also possible, however, to use a luminaire according to the invention for another field of application, e.g. as a pendant light or linear fluorescent luminaire.

Preferably, the light guide of a luminaire according to the invention is fabricated from pressed glass. The production of a light guide of this type is particularly easy and cost-efficient. However, other materials are conceivable, too.

Advantageous embodiments of the present invention are defined in the dependent claims.

In a preferred embodiment the LED is arranged at the light entrance end such that at least a portion of the light is passed through the light entrance aperture into the reflector. This allows a particularly simple construction of the luminaire.

In another preferred embodiment the light-guiding area has a substantially disc-shaped configuration. In this embodiment the light-guiding area has a substantially constant thickness and plane surfaces. In such a shape light can be guided particularly easily by total reflection.

It is also possible, however, to bend the light-guiding area, respectively, adapt the shape to different tasks.

In a particularly preferred embodiment the disc-shaped light-guiding area is configured to be apart, at an angle, from the light exit aperture at least section-wise. A greater portion of the light radiated from the LED is passed into the light guide as the angle of incidence of the light is reduced to the light guide. Moreover, it is thus possible that light in the light guide can be guided in the opposite direction of the radiation direction of the LED into an area behind the LED.

Preferably, the angle between the light-guiding area and the optical axis of the light guide is between 80° and 90°. A very compact configuration of the light guide, respectively, the luminaire in this range is possible, while a sufficiently great portion of the radiated light enters into the light guide.

It is a particular advantage if the ends of the light guide are angled, so that even light emerging from the LED very flatly is incident on the light guide.

In another preferred embodiment the light guide comprises a lens area, the lens area guiding a portion of the light into the reflector. Such a lens area allows the particularly easy refraction of the light cone radiated by the LED into the reflector.

Preferably, the light guide includes the lens area in the center, which is surrounded by the light-guiding area, respectively, merges into a light-guiding area on both sides. This allows a particularly uniform distribution of the light and an easy construction of the luminaire.

Advantageously, the lens area is arranged in the proximity of the light entrance aperture. This allows a particularly easy construction of the luminaire and the light guide.

It has proved to be particularly advantageous if the LED is arranged in the proximity of the surface of the lens area. This allows a particularly compact and efficient design. Depending on the task it is also conceivable that the lens area is configured as a diverging lens or converging lens.

In a particularly preferred embodiment the lens area is arranged at least partially in the light entrance aperture. This means that at least a part of the lens area projects through the light entrance aperture into the reflector. This allows a particularly compact design.

Advantageously, the light entrance aperture and the lens area are configured such that the lens area fills substantially the whole light entrance aperture. Thus, the light guide is particularly easy to mount on the reflector.

In a particularly preferred embodiment the light guide comprises at least one step between the lens area and the light-guiding area. The step may be formed on the surface of the light guide pointing to or away from the light exit aperture. It is also possible, however, that both surfaces comprise at least one step. This allows an even more compact design as the lens area is capable of projecting farther into the reflector, respectively, the LED can be arranged more closely to the light entrance aperture of the reflector with enough distance to the surface of the light guide.

In this embodiment it is conceivable that the edge of the light entrance aperture is configured to define a collar region which extends substantially perpendicular to the light entrance aperture. This collar region is in contact with the stepped area of the light guide. This allows the light guide to be easily fixed to the reflector by material fit or force fit methods.

If the backside of the light guide has a stepped shape material is moreover saved in this embodiment, and the loss of light by absorption is minimized.

It is also conceivable to form the step between the light-guiding area and the lens area such that the whole lens area is positioned inside the reflector and the LED, too, is arranged in the light entrance aperture, respectively, inside the reflector.

In another preferred embodiment the lens area has a plano-convex configuration, the plane surface of the plano-convex lens area pointing away from the light exit end of the reflector. Such a lens is very compact and allows the bundling of a portion of the light into the reflector and increasing the intensity of the radiated light.

In another preferred embodiment the width of the lens area is between 30% and 50% of the width of the light guide. In this range a particularly pleasant relationship is obtained between the light portions emitted by the reflector and through the luminaire shade.

In another preferred embodiment the width of the light guide in one direction amounts to at least 80% of the available width inside the luminaire shade in the area of the light guide. This allows a particularly uniform emission of the light through the luminaire shade. Preferably, the width of the light guide amounts to at least 90% of the available width. The more the light guide is approached to the luminaire shade, the more uniform can the luminaire shade be illuminated.

In another preferred embodiment at least a part of the surface of the reflector pointing to the luminaire shade is configured to be reflective. The light emitted by the light-guiding area in the direction of the surface of the reflector pointing to the luminaire shade is reflected in the direction of the luminaire shade. Thus, more light is emitted through the luminare shade.

In another preferred embodiment at least a part of the light guide surface has a defined surface structure, in particular a pyramid-shaped structure. Thus, the light guide can be adapted to different illumination-related tasks. In particular, at least a part of the surface of the light guide, on which the light from the LED is incident, may have such a surface structure so as to improve the coupling of the light.

It has proved to be advantageous if the light guide in the lens area has a pyramid-shaped structure on the side pointing to the LED. Thus, a greater portion of the light is coupled in and not reflected.

In another preferred embodiment at least a part of the light guide surface is frosted, in particular sandblasted. In this embodiment the diffuse emission of light is particularly easy.

It has proved to be advantageous if the light-guiding area is at least partially frosted. Thus, when exiting the light-guiding area, the light is mixed particularly well before being emitted through the luminaire shade. This allows a particularly uniform illumination of the surroundings through the luminaire shade.

In another preferred embodiment the reflector, the luminaire shade and the light guide are configured rotationally symmetrical and, together with the LED, are arranged coaxially relative to the optical axis of the light guide. Thus, a particularly uniform light distribution and an aesthetic overall impression are obtained.

Advantageously, the luminaire shade has a cylindrical shape and encompasses the whole reflector. Preferably, the light-guiding area is, in this case, configured as a frusto-conical shell with the lens area being adjacent in the center thereof.

In another preferred embodiment the reflector is configured as a parabolic reflector. This allows the emission of a light bundle as parallel as possible if the lens area maps the LED into the focal point of the parabolic reflector.

Alternatively, the reflector can be configured to be adapted to the shape of the lens area, so that a light beam as parallel as possible is emitted through the light exit aperture.

However, any other reflector types are conceivable as well for adapting the luminaire to different illumination-related tasks.

In another preferred embodiment the luminaire shade and the reflector are connected to one another at the light exit end. The luminaire shade and the reflector are configured as a component which allows a particularly simple mounting of the luminaire.

It has proved to be advantageous if the luminaire shade is provided with a thread at the end thereof pointing away from the reflector so as to be fixable to a housing of the luminaire.

It is particularly advantageous if, in this embodiment, the light guide is connected to the edge of the light entrance aperture, so that the light guide, the reflector and the luminaire shade form one component.

BRIEF DESCRIPTION OF THE DRAWINGS

An advantageous exemplary embodiment of the present invention will be explained in more detail below by means of drawings. In the drawings.

DETAILED DESCRIPTION

In the following description like parts will be designated with like reference numbers. If a drawing includes reference numbers which are not referred to in the associated description of the figures, reference will be made to the preceding or subsequent description of the figures.

Figure 1:
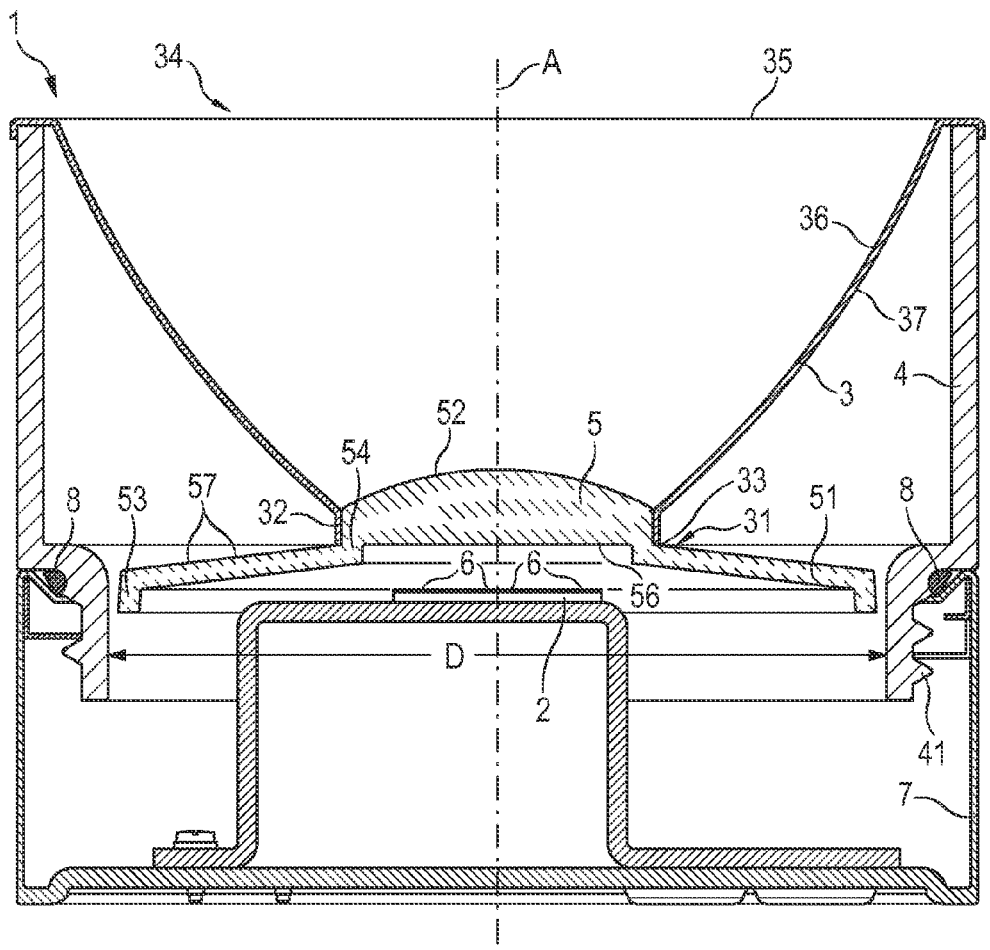
FIG. 1 shows a schematic cross-sectional view of a luminaire according to the invention.

The luminaire 1 according to the invention, illustrated in FIG. 1, is designed as a ceiling spotlight, respectively, downlight. The luminaire 1 includes a light source 2, a reflector 3, a luminaire shade 4 as well as a light guide 5. The reflector 3, luminaire shade 4 and light guide 5 are configured to be rotationally symmetrical with respect to the optical axis A of the light guide 5. In the exemplary embodiment shown the light source 2 is formed of several LEDs 6 which are arranged concentrically about the axis A. The LEDs are designed as SMD-LEDs and attached to the housing 7 of the luminaire 1.

The reflector 3 comprises a light entrance aperture 32 at its light entrance end 31. At its light exit end 34 the reflector 3 comprises a light exit aperture 35. A hollow-cylindrical collar region is formed at the edge 33 of the light entrance aperture 32, which extends substantially perpendicular to the light entrance aperture 32 in the direction of the LEDs 6. The reflector 3 is configured to be reflective on its inside 36 and outside 37.

The light guide 5 comprises a light-guiding area 51. The light-guiding area 51 is disc-shaped, and bent relative to the light exit aperture 35. The light-guiding area 51 runs at an angle of approximately 84° relative to the optical axis A. The light guide 5 defines thus a clearance 55 in which the LEDs 6 are arranged. The outer edge 53 of the light guide 5 is angled approximately parallel to the axis A in the direction of the LEDs. This arrangement allows a very great portion of the emitted light of the LEDs 6 to be radiated into the light guide 5. In the center of the light guide 5 same comprises a lens area 52, the light-guiding area 51 merging via a step 54 into the lens area 52. This allows an arrangement of the LEDs 6 particularly close to the light guide 5. The surface 56 of the lens area 52 pointing to the LEDs 6 has a pyramid-shaped surface structure so as to improve the coupling of the light into the light guide. The lens area 52 has a plano-convex shape. The lens area 52 is arranged in the light entrance aperture 32 of the reflector 3. The edge 33 of the light entrance aperture 32 is in contact with the step region 54 of the light guide 5. The lens area 52 fills the whole light entrance aperture 32 of the reflector 3. The light guide 5 is held by the edge 33 of the light entrance aperture 32 in a force-closed manner. The upper side 57 of the light-guiding area 51 is frosted by sandblasting. Thus, the light emitted by the light-guiding area 51 is mixed.

The luminaire shade 4 in the illustrated embodiment is opaque and surrounds the reflector 3 and the light guide 5. Thus, the light emitted through the luminaire shade 4 is diffuse.

The light emitted by the LEDs 6 is partially coupled through the pyramid-shaped surface structure 56 into the lens area 52, but partially also directly into the light-guiding area 51. A first portion of the coupled light is guided through the lens area 52 into the reflector 3, and emitted by the reflector 3 upwardly. A second portion is guided through the light-guiding area 51 radially outwardly, and is emitted through the frosted surface 57. This portion of the light is thereupon diffusely emitted to the outside through the luminaire shade 4, whereby it may be reflected once again on the outside 37 of the reflector 3 before.

In the embodiment shown the width B of the lens area 52 amounts to approximately 34% of the width C of the light guide 5. The luminaire shade 4 is cylindrical and has a thread 41 on the bottom side thereof. The width C of the light guide 5 amounts to more than 95% of the available width D inside the luminaire shade, whereby the available width corresponds to the inner diameter D of the luminaire shade 4 in the region of the thread 41. The reflector 3 is connected at its light exit aperture 34 to the luminaire shade 4.

In the embodiment shown the luminaire 1 comprises a cylindrical housing 7 which is screw-connected to the luminaire shade 4. A gasket 8 is arranged in the region of the screw connection between the housing 7 and the luminaire shade 4.

For mounting the luminaire 1, firstly the lens area 52 of the light guide 5 is clamped into the light entrance aperture 32 of the reflector 3. The reflector 3 is thereupon connected to the luminaire shade 4 at the light exit aperture 35. Lastly, the luminaire shade 4 is screwed to the housing 7.

Figure 2:
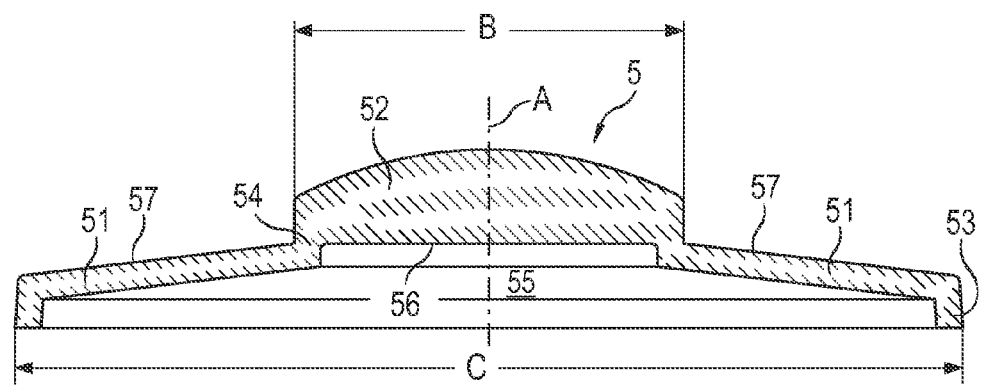
FIG. 2 shows a cross-section through the light guide of a luminaire according to the invention.

FIG. 2 illustrates the light guide of the luminaire according to the invention illustrated in FIG. 1 in more detail.

The invention claimed is:

1. A luminaire comprising a light source and a reflector, the reflector including a light entrance end and a light exit end, the light entrance end comprising at least one light entrance aperture with an edge and the light exit end comprising a light exit aperture, the luminaire further comprising a luminaire shade which encompasses the reflector at least partially, wherein a first portion of the light of the light source is not emitted through the luminaire shade, but emitted by the reflector through the light exit aperture, and a second portion of the light of the light source is emitted through the luminaire shade, wherein the light source is an LED, the luminaire further comprising a light guide which is separate from the reflector and arranged in the area of the light entrance aperture between the LED and the light exit end such that at least a portion of the light of the LED enters into the light guide, the light guide comprising a light-guiding area which extends in a direction perpendicular to the longitudinal extension of the reflector at least partially beyond the edge of the light entrance aperture, and wherein the light-guiding area extends, with respect to an axial direction defined by said longitudinal extension of the reflector, in front of the light entrance aperture.

2. The luminaire according to claim 1, wherein the light-guiding area has a substantially disc-shaped configuration.

3. The luminaire according to claim 2, wherein the light-guiding area is configured to be apart, at an angle, from the light exit aperture at least section-wise.

4. The luminaire according to claim 1, wherein the light guide comprises a lens area, the lens area guiding a portion of the light into the reflector.

5. The luminaire according to claim 4, wherein the lens area is arranged at least partially in the light entrance aperture.

6. The luminaire according to claim 4, wherein the light guide comprises at least one step between the lens area and the light-guiding area.

7. The luminaire according to claim 4, wherein the lens area has a plano-convex configuration, the plane surface of the plano-convex lens area pointing away from the light exit end of the reflector.

8. The luminaire according to claim 4, wherein the width of the lens area is between 30% and 50% of the width of the light guide.

9. The luminaire according to claim 1, wherein the width of the light guide in one direction amounts to at least 80% of the available width inside the luminaire shade in the area of the light guide.

10. The luminaire according to claim 1, wherein at least a part of the surface of the reflector pointing to the luminaire shade is configured to be reflective.

11. The luminaire according to claim 1, wherein at least a part of the light guide surface has a defined surface structure.

12. The luminaire according to claim 11, wherein the defined surface structure is a pyramid shaped structure.

13. The luminaire according to claim 1, wherein at least a part of the light guide surface is frosted.

14. The luminaire according to claim 13, wherein the frosted part of the light guide surface is formed via sandblasting.

15. The luminaire according to claim 1, wherein the reflector, the luminaire shade and the light guide are configured rotationally symmetrical and, together with the LED, are arranged coaxially relative to the optical axis of the light guide.

16. The luminaire according to claim 1, wherein the reflector is configured as a parabolic reflector.

17. The luminaire according to claim 1, wherein the luminaire shade and the reflector are connected to one another at the light exit end.

* * * * *